US010826836B1

(12) United States Patent
Kannan et al.

(10) Patent No.: US 10,826,836 B1
(45) Date of Patent: Nov. 3, 2020

(54) OPPORTUNISTIC PACKET NETWORK FLOW CONTROLLER WITH IMPLICIT BIAS CORRECTION

(71) Applicant: Amazon Technologies, Inc., Seattle, WA (US)

(72) Inventors: Gopinathan Kannan, Redmond, WA (US); Thomas Yves Paul Helleboid, Seattle, WA (US); Ruipeng Huang, Seattle, WA (US); Akshay Malik, Seattle, WA (US); Aniket V. Oak, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 15/794,651

(22) Filed: Oct. 26, 2017

(51) Int. Cl.
| H04L 12/851 | (2013.01) |
| H04L 12/911 | (2013.01) |
| H04L 12/26 | (2006.01) |
| H04L 12/24 | (2006.01) |
| H04L 12/801 | (2013.01) |
| H04L 12/751 | (2013.01) |

(52) U.S. Cl.
CPC .......... *H04L 47/245* (2013.01); *H04L 43/062* (2013.01); *H04L 43/0876* (2013.01); *H04L 47/823* (2013.01); *H04L 41/5019* (2013.01); *H04L 45/02* (2013.01); *H04L 47/127* (2013.01)

(58) Field of Classification Search
None
See application file for complete search history.

(56) References Cited

U.S. PATENT DOCUMENTS

| 6,370,222 | B1* | 4/2002 | Cornick, Jr. | G01V 5/0016 378/57 |
| 8,954,491 | B1* | 2/2015 | Medved | H04L 45/02 709/203 |
| 9,786,187 | B1 | 10/2017 | Bar-Zeev | |
| 2003/0151546 | A1 | 8/2003 | Lee | |
| 2005/0232263 | A1* | 10/2005 | Sagara | H04L 45/02 370/389 |
| 2005/0243830 | A1* | 11/2005 | Wrenn | H04L 45/02 370/394 |
| 2007/0117617 | A1* | 5/2007 | Spanton | A63F 13/12 463/29 |
| 2009/0076933 | A1 | 3/2009 | Park | |
| 2011/0066549 | A1* | 3/2011 | Whitehouse | G06Q 10/0831 705/39 |
| 2013/0262953 | A1* | 10/2013 | Deng | G06F 11/1004 714/752 |
| 2013/0265178 | A1 | 10/2013 | Tengler | |

(Continued)

*Primary Examiner* — Alex Skripnikov
*Assistant Examiner* — Richard Schnell
(74) *Attorney, Agent, or Firm* — Knobbe, Martens, Olson & Bear, LLP

(57) ABSTRACT

Features related to systems and methods for opportunistic packet network flow controller with implicit bias correction are disclosed. Features are described for generating short term forecasts based on external inputs such as historical flow data and future events, in a large scale network flow carrying heterogeneous packets with limited bandwidth along its connections. The bias in forecast is continuously corrected based on current flow telemetry and new external inputs leading to automatically adjusting the flow control at every connection based on current and anticipated volume, in real time.

18 Claims, 6 Drawing Sheets

(56) References Cited

U.S. PATENT DOCUMENTS

| | | | |
|---|---|---|---|
| 2014/0075513 A1 | 3/2014 | Trammel | |
| 2014/0301192 A1* | 10/2014 | Lee | H04L 47/10 |
| | | | 370/230 |
| 2015/0039329 A1* | 2/2015 | Wirtz | G06Q 10/08 |
| | | | 705/2 |
| 2015/0105941 A1 | 4/2015 | Pandya | |
| 2015/0242811 A1 | 8/2015 | Gillen | |
| 2015/0324744 A1 | 11/2015 | Fokkelman | |
| 2015/0370251 A1 | 12/2015 | Siegel | |
| 2016/0099927 A1 | 4/2016 | Oz | |
| 2016/0148154 A1 | 5/2016 | Tibbs | |
| 2016/0189098 A1 | 6/2016 | Beaurepaire | |
| 2016/0210590 A1 | 7/2016 | Sugioka | |
| 2016/0342943 A1 | 11/2016 | Wiechers | |
| 2017/0018181 A1 | 1/2017 | Davidsson | |
| 2017/0230831 A1 | 8/2017 | Canis | |
| 2018/0234166 A1* | 8/2018 | Peponides | H04B 7/18513 |
| 2018/0240067 A1 | 8/2018 | Oz | |
| 2020/0019925 A1* | 1/2020 | Tokhtabaev | H04W 4/00 |
| 2020/0074396 A1 | 3/2020 | Boccuccia | |

\* cited by examiner

OPPORTUNISTIC PACKET NETWORK FLOW CONTROLLER WITH IMPLICIT BIAS CORRECTION

BACKGROUND

Networks are a ubiquitous part of the modern world. Networks are part of the systems people use to communicate. Networks are physically present to distribute items from a first location to a second location. A network may include multiple routes from the first location to the second location. To ensure an item passes through the networks to the appropriate destination, many networks include a flow controller to direct the item along an efficient route to the destination. Efficiency may be measured based on traffic volume, traffic rate, traffic size, or other measurable factor of the network.

For example, computing devices may utilize a communication network, or a series of communication networks, to exchange packets of data. Companies and organizations operate computer networks that interconnect a number of computing devices to support operations or provide services to third parties. The computing systems can be located in a single geographic location or located in multiple, distinct geographic locations (e.g., interconnected via private or public communication networks). Such systems may rely on accurate flow control to ensure the network maintains an expected service level.

As another example, a distribution network may include fulfillment centers that can receive and distribute items. The ability of a fulfillment center to receive and distribute items may be limited by physical constraints of the fulfillment center such as storage capacity or a number of loading docks. The fulfillment center may also be constrained by the processing equipment available to the fulfillment center to receive, store, or transfer items. Processing equipment may include forklifts, conveyors, storage bins, trucks, airplanes, trains, drones, mobile drive units, workforce, and the like.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
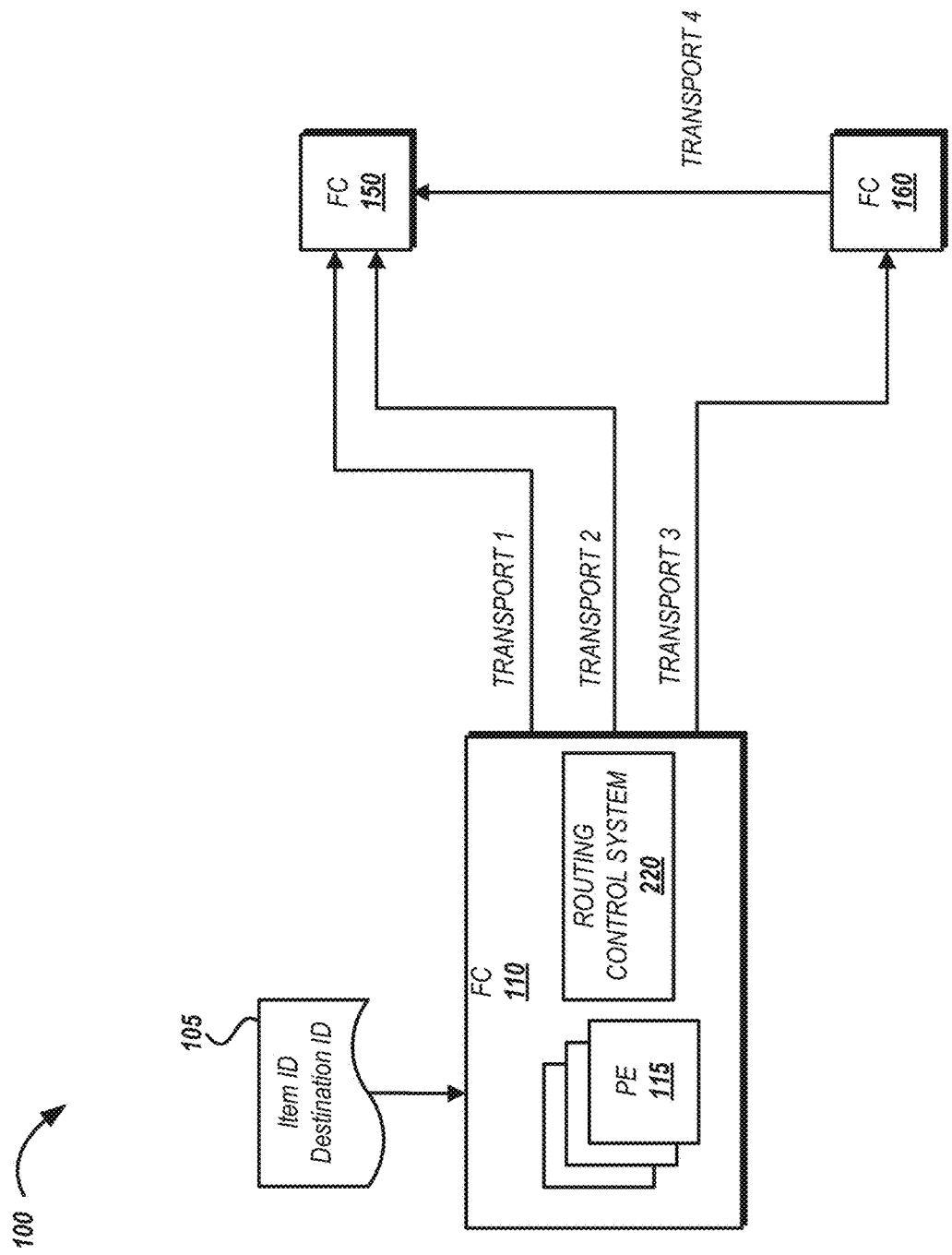
FIG. 1 is a pictorial diagram depicting a distribution network including a routing control system.

Some network systems may include a route planning service that selects a way to transmit an item from a node (e.g., a fulfillment center (FC)) to another location such as another FC or an end-user. Route planning services may identify routes using two phases: (a) a route evaluation phase; and (b) a route ranking phase. The evaluation phase may identify a set of transmission routes that can move the item from the node to the destination location. The pool of transmission routes may be analyzed according to item shipment attributes such as item type (e.g., hazardous material, perishable, video, voice, text, etc.), item service level (e.g., one day delivery, high-bandwidth service, etc.), sender or recipient profile information (e.g., location type (e.g., residential, apartment, commercial, drop ship), transmission preferences, subscription level, etc.), or other item shipment information. After the evaluation phase, a chain of comparators may be included to rank the identified set of transmission routes according to predetermined policies such as a routing policy identifying criterion for selecting routes. One example of a criterion that may be identified in a routing policy is cost. For example, a comparison costs between routes to select the route that minimizes the total cost of transmitting an item may be specified via a routing policy. The cost for a route may include one or more of financial cost, distance (e.g., length or number of nodes from a first location to a second location), time, bandwidth, throughput, or other measurable resource utilized during the transmission of the item from a node to a destination. In some implementations, the criterion may be evaluated per resource included in a route. For example, if the routing policy indicates a lowest cost criterion, the route may be generated by adding resources to the route that utilize the lowest cost to transmit the item from a first location to a second location. In some implementations, the number of candidate routes may be finite. In such instances, a set of routes may be analyzed according the routing policy to identify the route with the highest conformance to the routing policy (e.g., lowest cost, shortest distance, fastest service, highest bandwidth, etc.).

One way an item may be routed is by considering each item in isolation. In such implementations, the route planning service operates on a single item at a time and is by nature "greedy". The greedy nature means that although the route planning service chooses the route that best fits the predetermined policies, the selection ignores other items. When certain routes are capacity limited, even if each individual decision is compliant with the policies, the overall assignment of a batch of items may be suboptimal.

In order to aim for optimum assignment overall, the features described include forming a batch of items for transfer and finding a combination of routes for the batch of items that meets an overall policy (e.g., lowest cost). This means that even though for some items, the route assignment may be more expensive than the cheapest individual option, the overall cost for the batch of items is lower.

Along with the implications of greedy nature, the route planning service may implement various dynamic offset controllers (distribution control and minimum targets). The offsets may help direct network traffic to new areas of the network which may not have historical traffic flow. The offsets may help ensure traffic is evenly distributed or distributed according to a distribution rule across the network by ensuring a minimum number of transmissions. For example, in some implementations, there may be a requirement to ensure that each item transmitted via a first route has a corresponding transmission via a second route to avoid monopolization or other network bottlenecks. Due to these offsets, the route planning service may upgrade the certain items from one available method (e.g., low cost) to an alternative method (e.g., higher cost). These offsets may also be applied in a greedy fashion, ignoring any other items and overall network capacity constraints. Offsets may thus be applied blindly to any item that arrives until the target is met.

Flow control can help ensure all capacity is utilized when demand is approximately equal to capacity. In a physical distribution network, demand may be approximately equal to capacity during the holiday season when many items are being transmitted through the physical distribution network. To ensure the network is operating at full capacity, it may be desirable to look not at individual item routes, but to identify routes that utilize procured capacity to the fullest for a batch of items. Due to the greedy nature discussed above, some implementations may fill the most desirable method first (e.g., the method that best fits the predetermined policies). Once the most desirable method achieves full capacity, the routing system may then assign items to the second best method. This may be satisfactory if the two methods provide similar service levels. For example, the two methods may have pickup times that are relatively close to each other. However, in a scenario where the first method occurs later than the second method, by the time the route planning service assigns items to the second-later method, the pickup time of the second method may be close at hand. Hence the route planning service has a short duration of time to assign packages to an alternative method. This may also affect advertised network service levels such as via a user facing catalog service or network capability broadcast message. In a physical distribution implementation facing such timing constraints, an earlier, more expensive truck may leave with unused capacity (e.g., empty space), and the promises for items requested after the pickup by that truck may be delayed.

Flow control can also help ensure that later departing transmission methods are available to receive items for a longer period of time. In a day to day scenario where there are two competing transfer methods, it may be desirable to upgrade some items to earlier but more expensive routes. This may be counter to a "greedy" cost minimization policy, but if capacity is available on the later method, a service level may be promised to end users for a longer period of time. This may result in an overall increase in not only the throughput of the network, but may actually increase requests for items as the service level afforded by the later method may be available for a longer period of time.

For route assignments to be overall optimal, the systems and methods described receive a batch of item transfers to solve. Without batching, the systems and methods may not have sufficient information to identify an optimum route for the items. A linear or mixed integer optimizer can solve the batch of item transfers under given constraints to find a minimum overall resource expenditure for transferring the items. Features are also incorporated to consider minimum targets and distribution control in the optimization model. This will ensure that the items receiving any special routing are the globally optimal (e.g., provide the highest benefit in consideration of the network and other items). Network constraints (e.g., resource limitations, desired network traffic density, etc.) may also be accounted for by including dynamic assessment of node resource levels in the route planning service optimizer.

One benefit of an optimizer solution is generating better results in terms of conserving resources for a set of items across the network. The optimizer also ensures that any special routing such as based on predetermined network management goals such as minimum targets or distribution control, can be modeled as additional constraints and considered during route generation. Routes generated using route optimization may also achieve peak capacity utilization. Given enough demand, and with appropriate adjustment to constraints, the optimizer may utilize different transfer routes that may, for example, be earlier but more costly. The routes generated according to the features described may also allow advertisement of a service level for a longer duration of time. With proper constraint adjustment, the features can at minimum deliver a solution that may impact traffic volume and improve operation of the overall system. For example, in an electronic network, one way to route packets is by considering each packet in isolation. Thus the route planning phase for a packet is limited to consideration of the packet to be transmitted and ignores any other network utilization or other packets that are in the process of transmission or will be transmitted. The utilization of various network nodes may be predicable or estimable. In such implementations, the system may seek to identify an optimized route for a packet in consideration of anticipated network resource demand. In this way, the quality of service may be increased across the network.

Generally described, aspects of the present disclosure relate to network flow control. By accounting for current and expected network traffic flow, opportunity costs for network resources can be generated that look may be used to generate physical or electronic network routes having a network-wide optimization as opposed to routes optimized only for the item being routing. The opportunity costs may be continually evaluated as items are routed to provide correction of implicit bias in the route selection.

For example, features related to systems and methods for opportunistic packet network flow control with implicit bias correction are disclosed. Features are described for generating short term forecasts based on external inputs such as historical flow data and future events, in a large scale network flow carrying heterogeneous packets with limited bandwidth along its connections. The bias in forecast may be continuously corrected based on current flow telemetry and new external inputs leading to automatically adjusting the flow control at every connection based on current and anticipated volume, in real time.

The specification may refer to networks including physical fulfillment centers for distributing items. As discussed, the technical features may be applied to other network planning fields such as data packet network routing, transportation network routing, or other fields in which a route through a network of nodes is desired.

In a physical distribution network, the term "item" or "product" may include common items made available for purchase electronically or via the Internet, such as apparel, cookware, and physical media (e.g., DVDs or CDs). As used herein, the term "item," in addition to having its ordinary meaning, may be used interchangeably to refer to an item itself (e.g., a particular product) and to its description or representation in a computer system, such as a fulfillment distribution routing system, or electronic catalog. As will be apparent from the context in which it is used, the term is also sometimes used herein to refer only to the item itself or only to its representation in the computer system. In an electronic network setting, an item or product may include digital content item, a packet or group of packets of data for transmission from a first electronic device to a second electronic device.

FIG. 1 is a pictorial diagram depicting a distribution network including a routing control system. The environment 100 in FIG. 1 includes three fulfillment centers (FCs), fulfillment center 110, fulfillment center 150, and fulfillment center 160. A fulfillment center may include processing equipment. For example, the fulfillment center 110 includes processing equipment 115. Processing equipment may include conveyors, forklifts, mobile drive units, storage racks or bins, scanners, loading docks, or other devices for receiving, storing, and transferring an item. In a packet network, the processing equipment may include routers, switches, gateways, servers, hubs, or other networking equipment to transmit and receive packet data. Processing equipment may be configured by one or more messages indicating how to direct an item. For example, a message may be received by a piece of processing equipment to adjust an operational state of the processing equipment to direct a physical object to a desired location. One example of such a message is a message to adjust the direction of a chute for conveying an item from a storage bin to a transfer location. The message may cause a motor or other mechanical device of the processing equipment to change physical state to direct an item to a specific location. In some implementations, the adjustment may include specifying a route such as for a drone or other autonomous resource.

The fulfillment center 110 may also be associated with transport paths. A transport path may identify a portion of a route that an item may travel between two network nodes (e.g., FCs). As shown in FIG. 1, the FC 110 has three transport paths, two of which can be used to directly reach the FC 150 and one that can be used to reach the FC 160. Other transport paths may exist in the environment 100. For example, a transport path may exist between the FC 160 and the FC 150.

The FC 150 may receive item information 105. The item information 105 may identify an item and a destination. In some implementations, the item information may include additional or alternative information about the item transfer such as the sender, the receiver, a service level, special handling for the item (e.g., hazardous material, perishable, temperature sensitive, etc.), or an order with which the item is associated. The FC 110 may use the item information 105 to identify a route to the destination. For example, assume the destination identified by the item information 105 is the FC 150. In the environment 100 shown in FIG. 1, there are three routes to transmit the item from FC 110 to FC 150. Table 1 summarizes the possible routes and includes hypothetical costs using greedy routing and opportunistic routing.

TABLE 1

| Route | Transport | Cost - Greedy | Cost - Opportunistic |
| --- | --- | --- | --- |
| Route 1 | Transport 1 (ground) | 4 | 6 |
| Route 2 | Transport 2 (air) | 10 | 10 |
| Route 3 | Transport 3 (air), Transport 4 (air) | 7 | 5 |

Using the environment 100 shown in FIG. 1 and the possible routes for an item, under a greedy routing method, the item may be routed via route 1. However, this route may be not be an optimal route when considering that other items are scheduled or expected to be scheduled for transmission. The features described herein include batch optimization of item route assignments. Optimization may be achieved by changing the ranking phase of a routing service to identify assignments that meet a predetermined criterion. The systems and methods described may receive a batch of item information, each associated with an item to be routed to a destination. Optimized routes under a set of constraints may be generated and used to produce a set of routing values that can be given to a route planning service to affect the assignment by weighting certain factors associated with nodes under consideration by the routing service. The constraints considered during the optimization may include the carrier capacity constraints (caps) or minimum volume (sunk cost) constraints.

Figure 2:
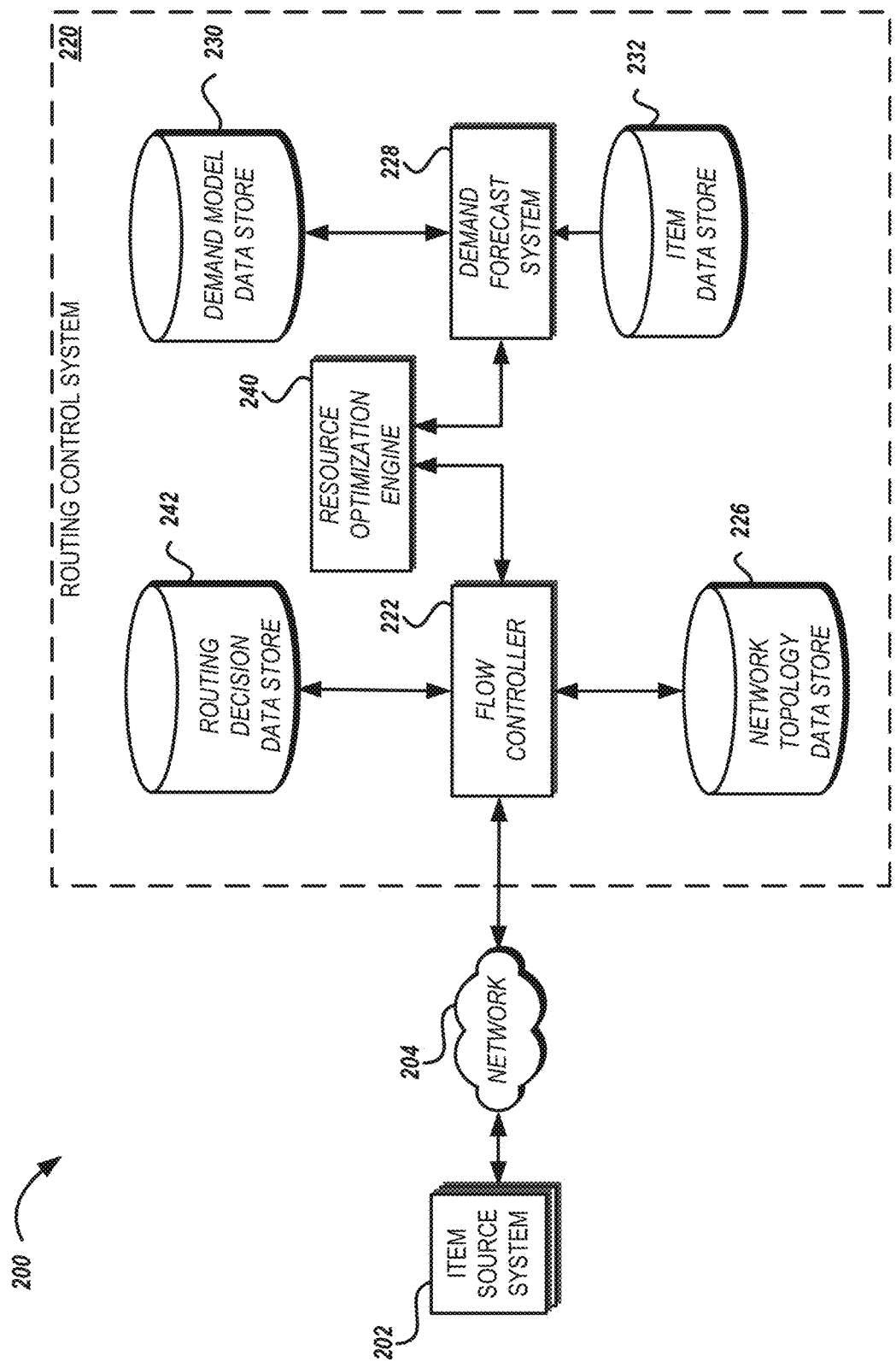
FIG. 2 is a block diagram depicting an illustrative operating environment for a routing control system.

FIG. 2 is a block diagram depicting an illustrative operating environment for a routing control system. The item information 105 may be included in a message received from a source system 202 by a routing control system 220. The routing control system 220 may implement one or more aspects of the route planning service. In some implementations, the item identifier may be used to acquire additional information about the item such as from a catalog system (not shown). The item information 105 may be received by the item source system 110 through a user interface or machine interface specifically configured to receive, transmit, and respond to network routing information.

Communication between the routing control system 220 and an item source may be via a network 204. The network 204 may be any wired network, wireless network, or combination thereof. In addition, the network 204 may be a personal area network, local area network, wide area network, cable network, satellite network, cellular telephone network, etc. or combination thereof. For example, the network 204 may be a publicly accessible network of linked networks, possibly operated by various distinct parties, such as the Internet. In some embodiments, the network 204 may be a private or semi-private network, such as a corporate or university intranet. The network 204 may include one or more wireless networks, such as a Global System for Mobile Communications (GSM) network, a Code Division Multiple Access (CDMA) network, a Long Term Evolution (LTE) network, or some other type of wireless network. The network 204 may use protocols and components for communicating via the Internet or any of the other aforementioned types of networks.

The routing control system 220 may include a flow controller 222. The flow controller 222 may receive the item information and generate a route for the item. The flow controller 222 may request network topology information from a network topology data store 226. The request may include one or more characteristics of the item included in the received item data 102 such as the item identifier or manufacturer of the item. Instead of, or as an alternative to, including in the received item data, the request may include characteristics of the item generated or obtained by the routing control system 220. For example, the characteristics may be retrieved from a catalog system based at least in part on the item identifier.

The network topology data source 226 may identify network resources for transferring the item from a first location to a destination location. Network resources may include suppliers (e.g., vendors or manufacturers), receiving nodes that can accept inventory from a supplier and redistribute to another node, intermediate nodes that can redistribute inventory received from other nodes within the network, and destination nodes that can provide inventory to a specified region. Some nodes may serve multiple roles. For example, a receiving node may also be a destination node for a particular demand stream. The network resources may be associated with a resource profile identifying transport paths to other nodes, schedule information for the resource (e.g., departure time, arrival time), cost for using the resource, and constraints for a given node or resources located at the node.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The flow controller 222 may request one or more forecasted network demand scenarios from a demand forecast system 228. The request may include characteristics of the item included in the received item data 105 such as the service level. The request may include characteristics of the item generated or obtained by the flow controller 222. For example, a type for the item may be identified by the flow controller 222 based on a comparison of the item with other items included in the catalog system. The request may include the network nodes received from the network topology data store 226. The request may include temporal information identifying one or more forecast dates (e.g., the planning period to which the forecast may pertain). The information included in the request may be used, at least in part, to select one or more forecasting models or as input values to a selected forecast model. The temporal information may be generated based on the resource profile for a network node. For example, it may be desirable to provide demand estimates for a period of time prior to departure from a node for a resource of the node.

A forecast model may be a machine learning model trained to receive a set of input values and generate a demand forecast for a network resource based on the input values. The demand forecast may project future demand for a given network resource based on, for example, past volumes of items transmitted by the network resource. The demand forecast may also consider geographic flows identifying to where items are sourced or transmitted. The demand forecast may also project the service level demand for a network resource. For example, a demand forecast may identify, for a date range, a set of resource demand values for a network resource at one or more service levels (e.g., bitrate, transmission arrival promise, etc.). Table 2 provides example projected demands for network resources.

TABLE 2

| Network Resource | Service Level | Projected Demand |
| --- | --- | --- |
| Router - ABC | 1 GB/sec | 2.4 TB/hour |
| Router - ABC | 650 MB/sec | 1.3 TB/hour |
| Router - XYZ | 1 GB/sec | 7.6 TB/hour |

In some implementations, the forecast model may be generated using machine learning to distinguish between different transmissions such as by origin of the transmission, destination of the transmission, or attributes of an item being transmitted (e.g., video data, audio data, fragile physical item, perishable physical item, etc.). Transmissions having a common origin or destination or item attributes may be grouped together. Demand may be estimated for resources historically used for a group of transmissions such as the demand for network resources for transmitting items including hazardous materials.

The forecast may include an estimated network demand quantity for one or more network nodes or resources therein and a probability for the estimate. The forecast model may be trained using training data. The training data may include, for example, input training data based on item attribute information of a number of items, historical network utilization for transferring the items, as well as advertised service level for the items. The training result data provided to the machine learning model may be split into training data and test data, as is known in the art of machine learning. For example, a certain percentage of the training data may be provided to train a model to assign weights to various item attributes, and then the remaining training data may be used to test the model's prediction capability for demand for the item under the provided forecast input values. The training data results (e.g., estimated demand for the provided forecast input values) may have been initially determined by a retailer, a manufacturer, a distributor, consumer surveys, and/or by other methods or entities.

Forecast models may be stored in a demand model data store 230. The forecast models may be indexed to facilitate efficient identification and retrieval of relevant models by the demand forecast system 228. For example, the models may be indexed by network resource such that forecast models for a network resource can be quickly retrieved based on an identifier of the network resource. As another example, the models may be indexed by resource location. For example, the forecast model for a first geographic region may be different than the forecast model for a second, different geographic region The demand forecast system 228 may receive the request for the demand scenarios. Using the information included in the request, the demand forecast system 228 may identify one or more demand models included in the demand model data store 230 and generate the demand scenario(s) based on the item data (e.g., service level, item type, source location, destination location, sender, receiver, etc.) or the identified nodes for transferring the item to its destination.

The flow controller 222 may request resource allocation adjustments from an resource optimization engine 240. The resource optimization engine 240 may generate allocation adjustments for identified resources that can be used to mitigate greedy route planning. The resource optimization engine 240 may generate a first set of resource allocations based on future network demand information collected for resources for transmitting the item. The first set of resource allocations may identify an ideal utilization of the network resources for the expected future demand. The resource optimization engine 240 may then generate a second set of resource allocations given the scheduled item transfers through the network. Where the first set of allocations represents utilization of the network under expected demand and the second set of allocations reflects the network utilization given actual demand. Based on a comparison of the first set of allocations with the second set of allocations, allocation adjustment values may be generated for each resource. The allocation adjustment values may be transmitted to the flow controller 222 and used to select an optimal route for the item. The allocation adjustment values may be stored in the routing decision data store 242. The route selected for an item may also be stored in the routing decision data store. The routing decision may be used by the resource optimization engine 240 when generating future resource allocation adjustments. For example, the routing decisions stored in the routing decision data store 242 may be used to generate the second set of resource allocations given the scheduled item transfers through the network.

Figure 3A:
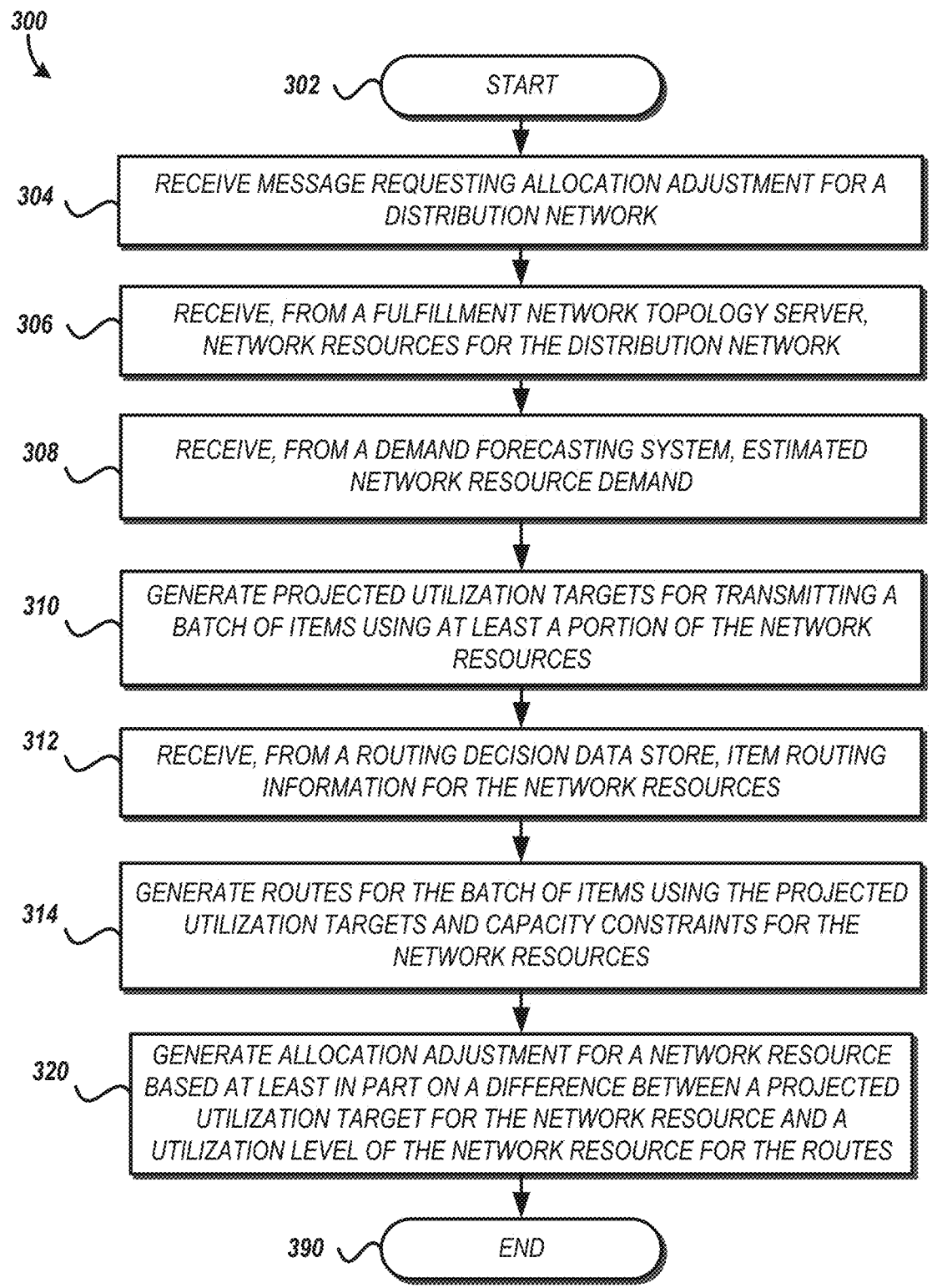
FIG. 3A is a flow diagram depicting an illustrative method of opportunistic flow control with implicit bias correction.

FIG. 3A is a flow diagram depicting an illustrative method of opportunistic flow control with implicit bias correction. The method 300 may be implemented in whole or in part by one or more of the devices described in this application, such as the routing control system 220. The method 300 generates network resource allocation adjustments to guide route selection to identify routes that are beneficial to an aggregated collection of items being routed rather than selecting a route for a given item without regard for other items or routes selected or likely to be selected. The method 300 may be considered opportunistic in part because the method 300 looks to predict demand and current resource commitments to identify those resources that may be prioritized over others. The method 300 avoids implicit bias by storing each allocation decision and feeding the decisions (e.g., scheduled routes) back into the consideration process for subsequent generation of allocation adjustment values and flow control.

The method 300 begins at block 302. At block 304, the routing control system may receive a message requesting allocation adjustments for the distribution network. The request may include a batch of items upon which the adjustments may be generated. In some implementations, the request may be based on time. For example, it may be desirable to generate allocation adjustments according to a schedule such as every 10 minutes. The route request may identify a source location and a destination location for items. The route may include a transport path within a physical location such as a fulfillment center. The route may include transfers between physical locations such as transmission by a courier from a first fulfillment center to a second fulfillment center. It will be understood that the request may identify specific locations to limit the number of network resources analyzed. For example, a set of source locations and destination locations may be identified.

At block 306, the routing control system may receive, from a fulfillment network topology server, a set of network resources for the distribution network. The set may include network resources that can convey items associated with the request. The network resources may include fulfillment centers or processing equipment at fulfillment centers. The set of network resources may include cost information for each resource in the set. The network topology server may also include information about the resources such as capacity, cost of the resource, or transport path information identifying, for a resource, a transport path to network resource in the set of network resources. The transport path may include a destination (e.g., network resource or geographic service area) and a cost for the transport path. Table 3 provides an example set of network resources and associated resource information that may be received from a network topology server.

TABLE 3

| Resource | Resource Cost (days) | Capacity (cubic feet) | Destination | Transfer Cost (days) |
|---|---|---|---|---|
| FC-1 | 10 | 10,000 | FC-2 | 2 |
| Truck - FC-1 | 2 | 300 | FC-2 | 1 |
| Rail - FC-1 | 3 | 1,000 | FC-2 | 2 |
| FC-2 | 10 | 100,000 | Metro Area 102 | 1 |

The routing control system may request the network resources based on one or more of the source location(s), destination location(s), item type(s), or item(s) to be transmitted through the network. If the request at block 306 does not include item or location information, the set of network resources received at block 306 may represent all resources available to the network.

At block 308, the routing control system may receive, from a demand forecasting system, estimated network resource demand for the set of network resources. The demand forecasting system may provide a prospective estimate of demand for each of the network resources. The estimated demand may include one or more of estimated capacity or estimated cost for a network resource. The routing control system may request the estimate based at least in part on a transfer commitment for items if identified in the request received at block 304. For example, if the items identified in the message received at block 304 have a promised delivery date of three days, the estimated demand may be requested for a planning period of three days. In some implementations, the duration of time may be specified in the message received at block 304. For example, the allocation adjustments may be requested for a period of time that is identified in the message (e.g., 1 week, 2 week, 1 month, etc.).

At block 310, the routing control system may generate projected utilization target value for transmitting a batch of items using at least a portion of the network resources included in the set of network resources. A projected utilization target value may identify an ideal utilization level for a network resource based on a projected demand for the network resource. The set of utilization target value may be generated in a "greedy" fashion, which identifies an optimum route for each item in the batch of items, irrespective of other items or currently scheduled items. Once the routes are identified, the utilization of a network resource across the routes for the items in the batch of items may be aggregated to generate the projected utilization target value for the network resource. The utilization target value may be optimized to provide the lowest cost route from a source location to a destination location. The lowest cost may be measured as length, resources used to traverse the route (e.g., cost, bandwidth, time, etc.), number of nodes traversed, or a combination of such factors.

At block 312, the routing control system may receive item routing information for the set of resources. The item routing information may include scheduled items to be transferred using a network resource and, in some implementations, capacity constraints for the network resources. The item routing information may be received from the routing decision data store which may include information for items scheduled for delivery through the network during a time period such as the time period for which the adjustments are being requested. In some implementations, the item routing information may include historical routing information such as from a preceding period (e.g., one week ago, one month ago, one year ago).

At block 314, the routing control system may generate routes for the batch of items using at least a portion of the network resources included in the set of network resources used at block 310. For example, a first route for transmitting a first item included in the batch of items from a first location to the second location may be identified based at least in part on the network resource information for the network resource and at least one constraint on the network resource. The routes identified at block 314 may also include a second route for transmitting the second item included in the batch of items from the first location to the second location. The routes at block 314 may generated in consideration of the item routing information from block 312, projected utilizations for network resources from block 310, as well as constraints for each network resource such as capacity constraints or previously generated allocation adjustments.

In some implementations, generating a route for an item may include comparing two potential routes for transferring the item from a source location to a destination location. For a given source location, two different resources may receive the item from the source location. The different resources may be identified in the resource information for the network resource at a given source location. A routing policy may be received to indicate how routes should be compared. For example, a lowest cost routing policy may identify a cost measurement criterion that can be used to identify which resources to include in the route. Under a lowest cost routing policy, the cost between the two different resources may be compared. Based on the routing policy and values from the resource information (e.g., resource characteristic, ideal projected utilization, etc.) for the candidate resources, a selection may be made. The selection may include identifying one of the different resources to add to the route based at least in part on the routing policy and resource information for the different resources. For example, a routing policy identifying a criterion for generating candidate routes may be received from a data store. A first value may be identified for a first resource included in first resource information corresponding to the criterion. For example, if the criterion is average resource load, the first resource information for the first resource may include a value indicating the average load for the first resource. A second value for the same criterion may be identified from second resource information for a second resource. Thus, the first resource may have an average resource load of 1.3 while the second resource may have an average resource load of 0.12. The first and second values may be compared to identify the resource having a more desirable operational status to include in the route. In the case of resource load, it may be desirable to direct the item via the second resource since the average load is lower than the average load of the first resource. The comparison for the criterion may also be specified via the routing policy. For example, it may be desirable to select a resource having higher bandwidth, lower latency, larger capacity, or more efficient power profile. The routing policy may identify one or more criteria and the relationship for comparing resources based on the one or more criteria.

A costing policy may be included to identify how a cost for a resource is generated. A cost generally identifies a utilization level for a resource. For example, cost may be measured in time, resources, distance, processor cycles, power consumption, network hops, throughput, bandwidth, or other network property measurable during transmission of an item. For example, a costing policy may indicate how a value for a criterion specified in a routing policy is applied to generate a cost value for a resource or route. For example, the criterion may identify handling time for a resource. Based on the item handled by the resource, the cost of different handling times may vary. For example, if the item is associated with high definition packet data, it may be desirable to expedite the delivery of the packets whereas if the item is associated with text packet data, it may be acceptable to handle these packets more slowly. The handling time may be identified in resource information for a candidate resource. In some implementations, the allocation adjustment may be a factor included in the costing policy. For example, the allocation adjustment may weight another criterion such as cost. In some implementations, the allocation adjustment may be an additional criterion constraining a resource. For example, the allocation adjustment may represent an additional cost for a resource and be applied according to a costing policy.

At this point in the method 300, an ideal utilization and a utilization based on planned routes for network resources may be generated. Based in part on the difference between the utilization for a network resource, an allocation adjustment value may be generated at block 320 for the network resource. The allocation adjustment value may be generated based on a comparison of the projected utilization of the resource and utilization of the network resource in the corresponding routes generated at block 314. For example Equation (1) provides one expression of how to compare the costs.

$$a_x = \frac{u_i - \sum_{r=0}^{n}(u_r)}{n}$$

EQUATION (1)

where
$a_x$ represents the allocation adjustment for network resource x;
r is a subset of routes including network resource x;
n represents the size of the subset of routes r using network resource x;
$u_i$ represents the ideal projected utilization for the network resource; and
$u_r$ represents the utilization of the network resource for route r.

The allocation adjustments may be stored in the routing decision data store for use by, for example, a flow controller in identifying routes. For example, the flow controller may receive a request to route an item from a first location to a second location. The flow controller may then collect network information to identify a route. The network information may include one or more of: resource capabilities, resource limitations, resource costs, or the allocation adjustments for a given resource. An allocation adjustment may be applied when comparing routes as a weighting factor for a resource. For example, if routes are assessed as a function of a quantity of network resources needed to transmit an item (e.g., "cost"), the cost for a route may be generated based on resource information for the resources included in the route, similar to the "greedy" route planning. However, one or more factors for a node associated with an allocation adjustment may be weighted by the allocation adjustment generated by the method 300 for the resource. In some implementations, the allocation adjustment may be included as a constraint when generating the cost. For example, the allocation adjustment may represent an additional cost (or benefit if negative) to using a particular network resource in a route.

Figure 3B:
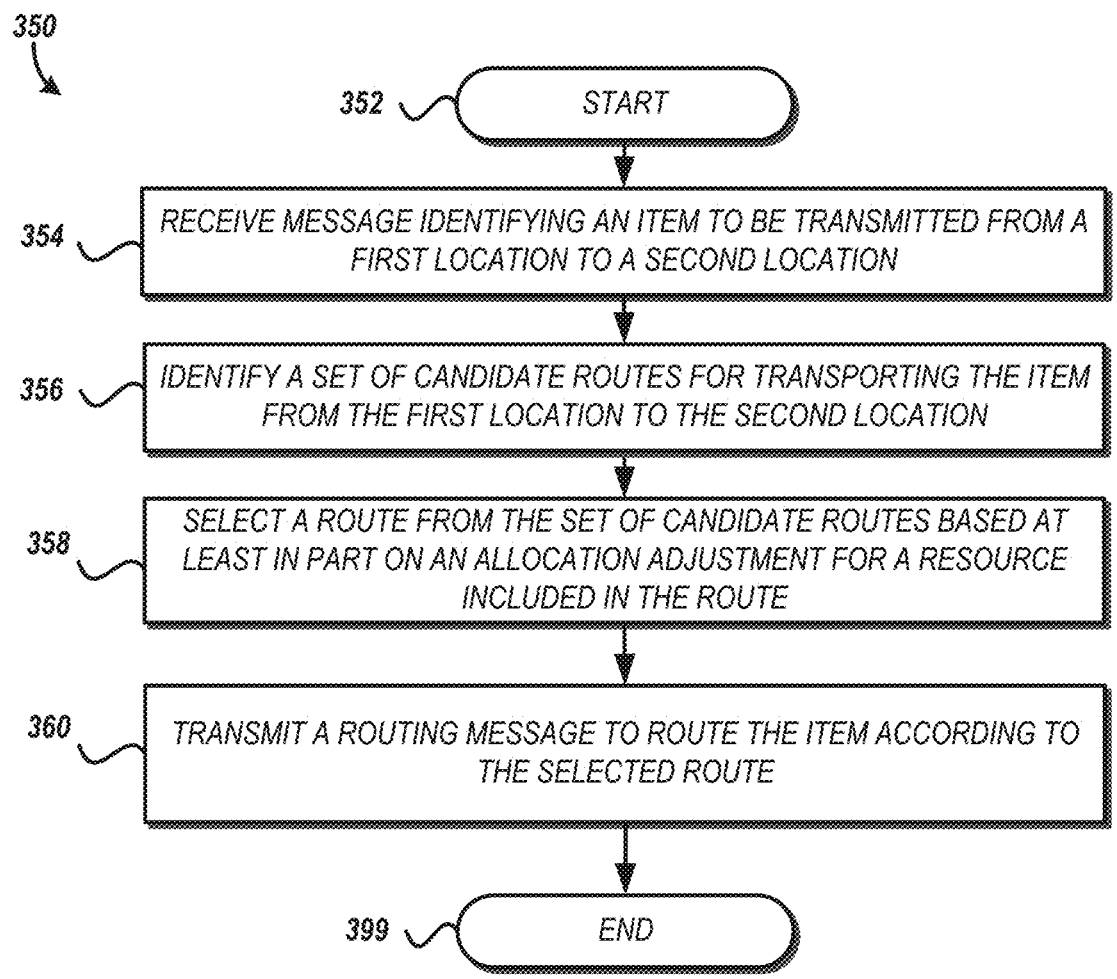
FIG. 3B is a flow diagram depicting an illustrative method of routing an item based on opportunistic flow control with implicit bias correction.

FIG. 3B is a flow diagram depicting an illustrative method of routing an item based on opportunistic flow control with implicit bias correction. The method 350 may be implemented in whole or in part by one or more of the devices described in this application, such as the routing control system 220. The method 350 illustrates how network resource allocation adjustments may be used to guide route selection to identify a route for an item.

The method 350 may begin at block 352 assuming allocation adjustments for at least some of the resources in the network for transmitting the item have been generated, such as via the method 300 shown in FIG. 3A. At block 354, a message may be received by the routing control system identifying an item to transmit from a first location to a second location. The message may be received from an item source system such as the item source system 202 shown in FIG. 2. The message may identify the item using an item identifier. The first and second location may be obtained, such as from a catalog data store, based on the item identifier. In some implementations, the message may include information identifying the first and second locations such as a geographic location identifier or an electronic network address.

At block 356, the routing control system may generate a set of candidate routes for transmitting the item from the first location to the second location. A candidate route may be a set of resources that form a route to move the item from the first location to the second location. The candidate route may be identified by first identifying a resource receiving the item. Based on the resource information for the resource receiving the item, a transmission path to a next resource may be identified to bring the item closer to the second location. In some implementations, a routing policy may be used to generate routes by identifying rules or criterion for organizing a sequence of resources to transmit the item. In some implementations, it may be desirable to generate a set of all possible routes. The set of candidate routes may be pre-generated and stored in a data store. In such implementations, the set of candidate routes may be associated with information identifying the first and second locations. Thus, the set of candidate routes can be retrieved from the data store based on the location information.

Having identified the candidate routes for transmitting the item, at block 358, the routing control system may identify a selected route from the set of candidate routes for transmitting the item. The selection may be based on a ranking of the set of candidate routes. The ranking may be performed according to a metric generated for each of the candidate routes. The metric may be identified using a costing policy. The costing policy may indicate how to combine resource information and constraints for a resource to generate the metric used to compare different routes. For example, the costing policy for a packet data network may indicate that the metric for ranking routes is based on a number of hops a route includes. In some implementations, the costing policy may also include an allocation adjustment for a resource. As discussed, the allocation adjustment may be used to weight the influence of a given resource to the overall cost of a route. The allocation adjustment may, in some implementations, be included as a constraint for the resource. In such instances, the allocation adjustment may represent an opportunity cost for utilizing a given resource. By including the allocation adjustment as part of the route selection, the route planning system operationalizes the opportunistic flow control with implicit bias correction associated with the allocation adjustment. Thus, the route may be selected from the set of candidate routes based at least in part on network resource information for candidate resources included in the selected route that are used to transmit the item and an allocation adjustment for a candidate resource included in the candidate resources At block 360, a routing message may be transmitted from the routing control system to cause the item to be routed along the selected route to the second location. As discussed, resources or processing equipment associated therewith may be controlled using messages such as the routing message. The routing message may control a physical sorting or processing device such as a conveyor belt, forklift, autonomous mobile drive unit, or the like. In some implementations, the routing message may include a shipping manifest entry. In such implementations, transmitting the routing message may include adding the shipping manifest entry to a shipping manifest for a resource included in the selected route. This allows the manifest for transmission resources such as autonomous vehicles to be generated at the point of making the routing decision and maintained as subsequent items are added or removed from the vehicle.

In an electronic network, the routing message may alter a router, gateway, or network translation device to direct packets to a desired destination. For example, a forwarding table entry may be added to a forwarding table to configure a network controller to direct packets from a source location to a destination location via a specific network. In some implementations, the routing message may delay delivery of a packet such as through buffering. For example, low priority packets (e.g., text) may be buffered for transmission at a later time to leave network resources such as bandwidth available for higher priority packets (e.g., voice or video). After transmitting the routing message, the method 350 may end at block 399.

Figure 4:
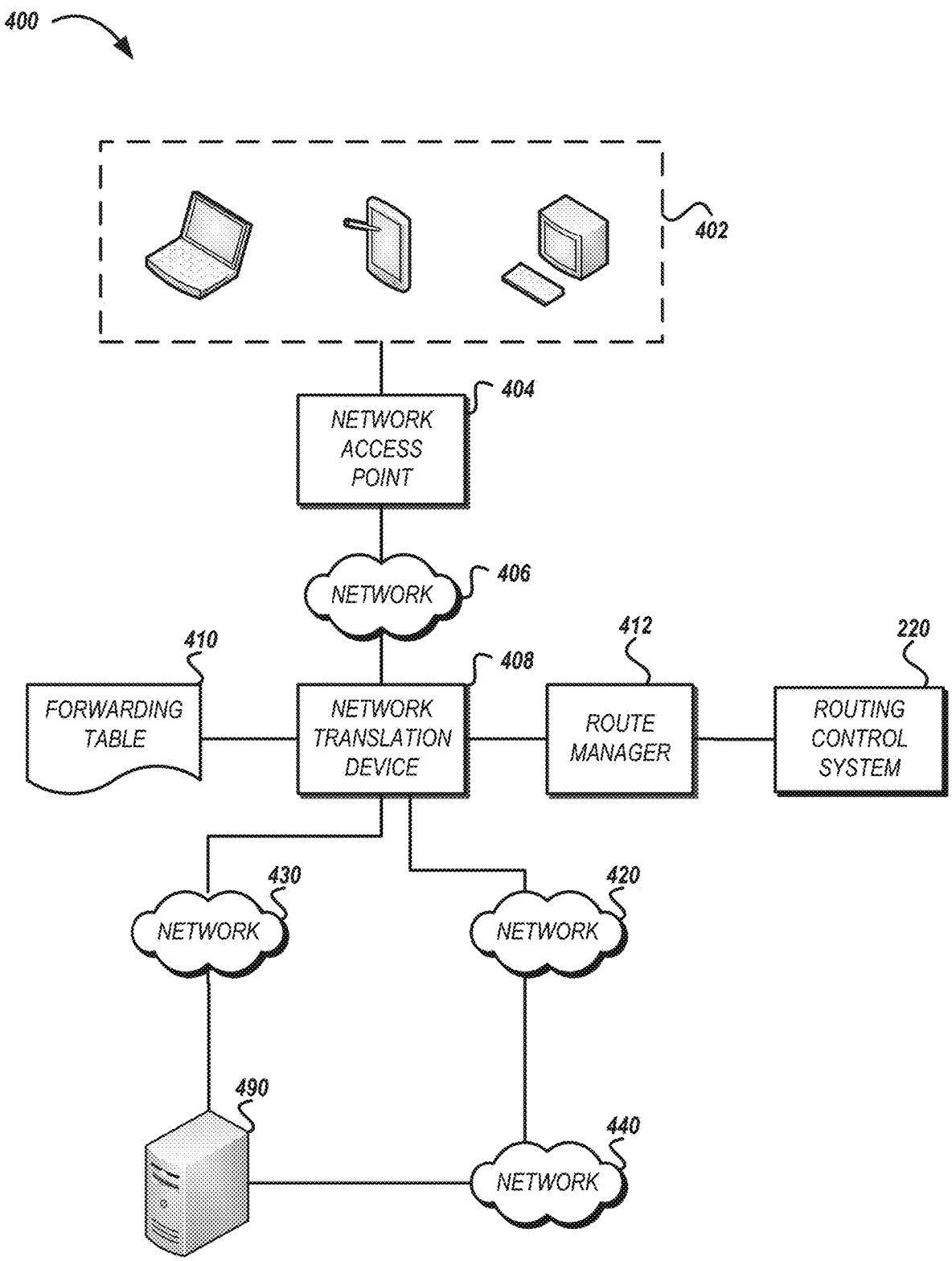
FIG. 4 is a block diagram depicting another illustrative operating environment for a routing control system.

FIG. 4 is a block diagram depicting another illustrative operating environment for a routing control system. The environment 400 of FIG. 4 represents a packet data routing network. The environment 400 may feature a collection of networks (e.g., network 406, network 430, network 420, and network 440). The networks may be the same type of network (e.g., wireless Long Term Evolution networks) or different types of networks (e.g., wired local area network and a wireless Global System for Mobile Communications network). The networks shown in FIG. 4 may be any wired network, wireless network, or combination thereof. In addition, the networks may be a personal area network, local area network, wide area network, cable network, satellite network, cellular telephone network, etc. or combination thereof. For example, the networks may be a publicly accessible network of linked networks, possibly operated by various distinct parties, such as the Internet. In some embodiments, the networks may be a private or semi-private network, such as a corporate or university intranet. The networks may include one or more wireless networks, such as a Global System for Mobile Communications (GSM) network, a Code Division Multiple Access (CDMA) network, a Long Term Evolution (LTE) network, or some other type of wireless network. The networks may use protocols and components for communicating via the Internet or any of the other aforementioned types of networks.

As shown, the environment 400 may have more than one route from an access device 402 to a destination server 490. For example, a packet may travel from the network 406 to the network 430 and then to the destination server 490. An alternate route could be from the network 406 to the network 420 then to the network 440 and finally to the destination server 490. As with routing physical items, determining which route is the most efficient can be determined on a packet by packet basis (e.g., greedy). Under this style of routing, an optimal route for a current packet may not be an optimal route for the entire system or the actual or expected demand schedule. Accordingly, it may be desirable to include the opportunistic flow control features described to help refine the true cost of a route by generating allocation adjustments for the network resources included in the environment 400.

The environment 400 may include one or more access devices. The access device 402 may be an electronic communication device configured to transmit or receive packet data via the network 406. Examples of such electronic communication devices include laptop computers, tablet computers, smartphones, desktop computers, servers, wearable devices (e.g., smartwatch or smartglasses), and the like.

The access device 402 may access the network 406 via a network access point 404. The network access point 404 may be a device configured to control connectivity of the access device 402 to the network 406. For example the network access point 404 may be a wireless access point that allows a Wi-Fi enabled access device to connect to the network 406.

The network 406 may include a network translation device 404. The network translation device 408 may be configured to direct communications addressed to destinations outside the network 406. The network translation device 408 may include a route manager 412 for determining a route for a data packet from the access device 402 to another location in the environment 400 such as a node associated with one of: the network 406, the network 430, the network 420, or the network 440.

In FIG. 4, the route manager 412 may receive routing information indicating that a route via the network 430 is preferred or has the lowest cost amongst all possible routes. The routing information may be generated by a routing control server using the route planning features described herein. The route manager 408 may store the routing information in a forwarding table 410. For example, the route manager 412 may direct data packets to a preferred destination by transmitting entries to the network translation device 408 that indicate where to send traffic with a specified destination address (e.g., the address of the destination server 490). The network translation device 408 may receive different forwarding entries from the forwarding table 410, such that data for one communication can be sent to the destination server 490 through the network 430, while another communication may be sent to the destination server 490 through the network 420 and the network 440. In some cases, packets with the same source or destination may be sent by different networks based on the associated virtual network. The entries included in the forwarding table 410 may be provided for specific data packets (e.g., destination, source, device type, packet data content type (e.g., text, video, audio, etc.)) or configured for all packets associated with the network 406.

In some embodiments, other networking equipment may be provided to identify and apply routing information. For example, a router or a network translation device can be configured to direct data packets along a preferred network route. Using blacklists, network traffic for a particular network can be allowed on one transmission path but blocked on others. The route manager 412 can send a control signal or message updating the blacklists to manage the data flow.

Other ways of communicating the routing information to direct data packets through a network include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" transmission path; and using Network Address Translation (NAT) devices on both ends of a network in order to redirect traffic into the network, such as by spoofing or altering an destination address for an incoming packing and/or altering an the source address of an outgoing packet. In some embodiments, the route manager 412 may generate control signals or messages for transmission to the routing components to coordinate traffic according to the identified route(s).

In generating routes, the route manager 412 may receive routing information or network resource information from the routing control system 220. For example, the routing control system 220 may include allocation adjustments for network resources. The routing control system 220 may provide the allocation adjustment to facilitate identification of a route that is optimal for the environment as a whole rather than for a specific packet at a specific time.

Figure 5:
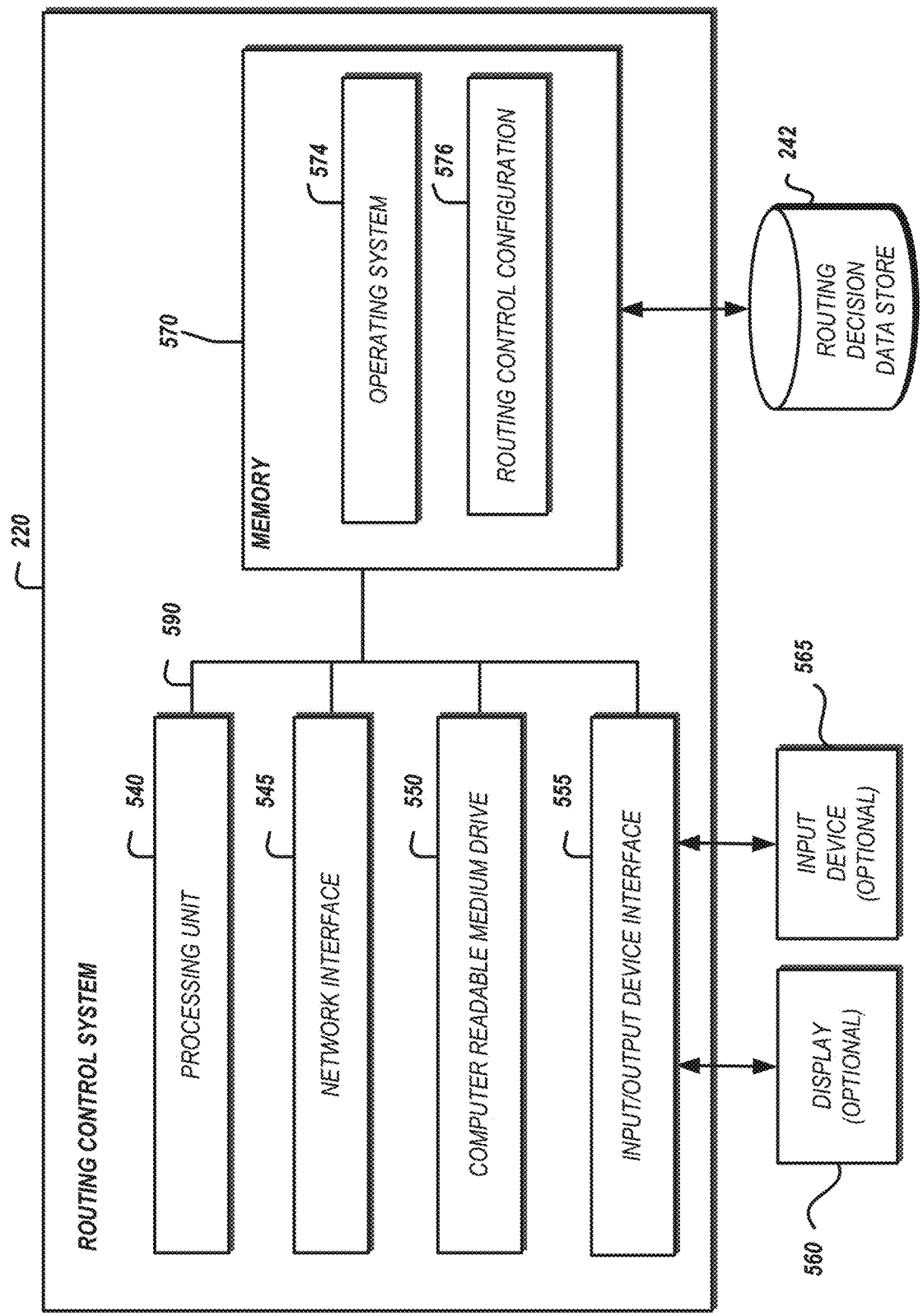
FIG. 5 is a block diagram depicting an illustrative architecture for a computing device for routing control.

FIG. 5 is a block diagram depicting an illustrative architecture for a computing device for routing control. The routing control system 220 can be a server or other computing device, and can comprise a processing unit 540, a network interface 545, a computer readable medium drive 550, an input/output device interface 555, and a memory 570. The network interface 555 can provide connectivity to one or more networks or computing systems such as the network 204 shown in FIG. 2. The processing unit 540 can receive information and instructions from other computing systems or services via the network interface 545. The network interface 545 can also store data directly to memory 570. The processing unit 540 can communicate to and from memory 570 and output information to an optional display 560 via the input/output device interface 555. The input/output device interface 555 can also accept input from the optional input device 565, such as a keyboard, mouse, digital pen, microphone, mass storage device, etc.

The memory 570 generally includes RAM, ROM, and/or other persistent, non-transitory computer readable media. The memory 570 can store an operating system 574 that provides computer program instructions for use by the processing unit 540 or other elements included in the computing device in the general administration and operation of the routing control system 220. The memory 570 can further include computer program instructions and other information for implementing aspects of the present disclosure.

For example, in one embodiment, the memory 570 includes a routing control configuration 576. The routing control configuration 576 may include policies, thresholds, or predetermined values to support the routing operations, such as opportunistic flow control, described herein. The routing control configuration 576 may store specific values for a given configuration. For example, the threshold for determining when to generate allocation adjustments may be specified as an absolute value (e.g., every day, week, 10 days, after receiving a threshold number of transfer requests, etc.). The values may be provided in a look up table indexed by one or more characteristics of an item or network resource such as item type (e.g., book, music, movie, clothing, text data packet, digital music file, voice data packet, real-time streaming data packet, etc.), resource type (e.g., fulfillment center, processing equipment, network switch, network router, etc.), or an identifier for the item or network resource.

Rather than storing express values for a particular configuration element, the routing control configuration 576 may, in some implementations, store information that allows the routing control system 220 to obtain a dynamically generated value for the given configuration element. For example, the identity of the default demand forecast system may be specified as a network location (e.g., URL) in conjunction with username and password information to access the network location to obtain the default demand forecast system that should be used by the routing control system 220.

The memory 570 may also include or communicate with one or more auxiliary data stores, such as the routing decision data store 242. The routing decision data store 242 may electronically store data regarding routes or network routing resources (e.g., allocation adjustments) generated by the routing control system 220, item source systems, and the like.

The elements included in the routing control system 220 may be coupled by a bus 590. The bus 590 may be a data bus, communication bus, or other bus mechanism to enable the various components of the routing control system 220 to exchange information.

In some embodiments, the routing control system 220 may include additional or fewer components than are shown in FIG. 5. For example, a routing control system may include more than one processing unit 540 or computer readable medium drive 550. In another example, the routing control system 220 may not be coupled to a display (e.g., the display 560) or an input device (e.g., the input device 565). In some embodiments, two or more routing control systems may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a routing control system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A routing control system can be or include a microprocessor, but in the alternative, the routing control system can be or include a controller, microcontroller, or state machine, combinations of the same, or the like configured to estimate and communicate routing control information. A routing control system can include electrical circuitry configured to process computer-executable instructions. Although described herein primarily with respect to digital technology, a routing control system may also include primarily analog components. For example, some or all of the network inventory planning algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a routing control system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the routing control system such that the routing control system can read information from, and write information to, the storage medium. In the alternative, the storage medium can be integral to the routing control system. The routing control system and the storage medium can reside in an ASIC. The ASIC can reside in a user terminal or item source system. In the alternative, the routing control system and the storage medium can reside as discrete components in a user terminal or item source system.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination.

In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network routing system comprising: a computer-readable memory storing executable instructions; and one or more computer processors in communication with the computer-readable memory, wherein the one or more computer processors are configured to execute the executable instructions to at least: receive, from a topology server, network resource information identifying a network resource for transmitting a first physical item and a second physical item from a first geographic location identified by a source address to a second geographic location identified by a destination address; receive, from a demand forecasting system, estimated resource demand for the network resource; generate a projected resource utilization value for transmitting at least one of the first physical item or the second physical item to the second geographic location using the network resource, wherein the one or more computer processors are further configured to execute the executable instructions to generate the projected resource utilization value based at least in part on the estimated resource demand; identify a first potential route for transmitting the first physical item from the first geographic location identified by the source address to the second geographic location identified by the destination address based at least in part on the network resource information for the network resource and at least one constraint on the network resource; identify a second potential route for transmitting the second physical item from the first geographic location identified by the source address to the second geographic location identified by the destination address based at least in part on the network resource information for the network resource and at least one constraint on the network resource; generate a planned utilization level for the network resource based at least in part on utilization of the network resource in the first potential route and utilization of the network resource in the second potential route; and generate an adjustment to how the network resource is allocated based at least in part on a comparison of the planned utilization level for the network resource and the projected resource utilization value for the network resource.

2. The network routing system of claim 1,
wherein the one or more computer processors are configured to execute the executable instructions to at least:

receive, from an electronic communication device, a message identifying a physical item to be transmitted from the first geographic location to the second geographic location;

generate a first candidate route for transmitting the physical item identified in the message from the first geographic location to the second geographic location, the first candidate route including the network resource;

generate a second candidate route for transmitting the physical item identified in the message from the first geographic location to the second geographic location, the second candidate route including an alternate network resource;

generate a first metric for the first candidate route based at least in part on: (i) the network resource information for the network resource, and (ii) the adjustment to how the network resource is allocated;

generate a second metric for the second candidate route based at least in part on second network resource information for the alternate network resource;

determine that the first metric identifies a utilization level that is less than a utilization level identified by the second metric; and transmit a routing message including instructions to route the physical item identified in the message according to the first candidate route to the second geographic location.

3. The network routing system of claim 2, wherein the one or more computer processors are configured to execute the executable instructions to at least:

store, in a data store, information indicating that instructions to route the physical item identified in the message according to the first candidate route were transmitted.

4. The network routing system of claim 2, wherein the network resource information for the network resource includes: (i) a resource cost for handling the physical item identified in the message; (ii) a resource capacity indicating a threshold quantity of physical items that can be handled by the network resource for a period of time; and (iii) a transmission path to at least one other network resource that can receive the physical item identified in the message from the network resource, wherein the one or more computer processors are configured to execute the executable instructions to at least:

determine that a first potential network resource and a second potential network resource can receive the physical item identified in the message from the network resource based at least in part on the resource information for the network resource;

receive, from a data store, a routing policy identifying a criterion for identifying the first potential route;

identify a first value for the first potential network resource included in first resource information corresponding to the criterion;

identify a second value for the second potential network resource included in second resource information corresponding to the criterion; and select the first potential network resource for the first candidate route based at least in part on the routing policy and the first value and the second value.

5. A routing system comprising: a computer-readable memory storing executable instructions; and one or more computer processors in communication with the computer-readable memory, wherein the one or more computer processors are configured to execute the executable instructions to at least: receive, from an electronic device, a request for a selected physical item to be transmitted from a first geographic location identified by a source address to a second geographic location identified by a destination address; generate a first candidate route for transmitting the selected physical item from the first geographic location identified by the source address to the second geographic location identified by the destination address, the first candidate route including a network resource; generate a second candidate route for transmitting the selected physical item from the first geographic location identified by the source address to the second geographic location identified by the destination address, the second candidate route including an alternate network resource; obtain an adjustment to how the network resource is allocated for the first candidate route, wherein the adjustment is based at least in part on a projected utilization value for the network resource to transmit the selected physical item from the first geographic location identified by the source address to the second geographic location identified by the destination address, as compared to a planned utilization value for the network resource, and where the projected utilization value for the network resource is determined from an estimated resource demand for the network resource; generate a first metric for the first candidate route based at least in part on: (i) network resource information for the network resource, and (ii) the adjustment to how the network resource is allocated for the first candidate route; generate a second metric for the second candidate route based at least in part on alternate network resource information for the alternate network resource; determine that the first metric identifies a utilization level that is less than a utilization level identified by the second metric; and transmit a routing message including instructions to route the selected physical item according to the first candidate route.

6. The routing system of claim 5, wherein the one or more computer processors are configured to execute the executable instructions to at least:

receive, from a topology server, resource information identifying the network resource for transmitting a first physical item and a second physical item from the first geographic location identified by the source address to the geographic second location identified by the destination address;

receive, from a demand forecasting system, the estimated resource demand for the network resource;

generate the projected utilization value for transmitting at least one of the first physical item or the second physical item to the second geographic location identified by the destination address using the network resource, said generating based at least in part on the estimated resource demand;

identify a first potential route for transmitting the first physical item from the first geographic location identified by the source address to the second geographic location identified by the destination address based at least in part on the network resource information for the network resource and at least one constraint on the network resource;

identify a second potential route for transmitting the second physical item from the first geographic location identified by the source address to the second geographic location identified by the destination address based at least in part on the network resource information for the network resource and at least one constraint on the network resource;

generate a planned utilization level for the network resource based at least in part on utilization of the network resource in the first potential route and utilization of the network resource in the second potential route; and generate the adjustment to how the network resource is allocated based at least in part on a comparison of the planned utilization level for the network resource and the projected utilization value for the network resource.

7. The routing system of claim 6,
wherein the one or more computer processors are configured to execute the executable instructions to at least:
store, in a data store, information indicating that instructions to route the selected physical item according to the first candidate route were transmitted.

8. The routing system of claim 6,
wherein the one or more computer processors are configured to execute the executable instructions to at least receive, from a data store, a planning period identifying a period of time during which physical items will be transmitted, and
wherein the estimated resource demand includes a demand estimate for a length of time corresponding to the period of time.

9. The routing system of claim 5,
wherein the network resource information for the network resource includes: (i) a resource cost for handling the selected physical item; (ii) a resource capacity indicating a threshold quantity of physical items that can be handled by the network resource for a period of time; and (iii) a transmission path to at least one other network resource that can receive the selected physical item from the network resource,
wherein the one or more computer processors are configured to execute the executable instructions to at least:
determine that a first potential network resource and a second potential network resource can receive the selected physical item from the network resource based at least in part on the resource information for the network resource;
receive, from a data store, a routing policy identifying a criterion for generating routes for the first physical item and the second physical item;
identify a first value for the first potential network resource included in first resource information corresponding to the criterion;
identify a second value for the second potential network resource included in second resource information corresponding to the criterion; and
select the first potential network resource for the first candidate route based at least in part on the routing policy and the first value and the second value.

10. The routing system of claim 5,
wherein the one or more computer processors are configured to execute the executable instructions to at least:
receive, from a data store, a costing policy indicating how resource information values for resources included in the first candidate route are combined to generate the first metric, wherein the costing policy weights a value identified in the network resource information for the network resource based at least in part on the adjustment.

11. A computer-implemented method comprising: under control of one or more computing devices executing specific computer-executable instructions, generating a first candidate route for transmitting a selected physical item from a first geographic location identified by a source address to a second geographic location identified by a destination address, the first candidate route including a network resource; generating a second candidate route for transmitting the selected physical item from the first geographic location identified by the source address to the second geographic location identified by the destination address, the second candidate route including an alternate network resource; obtaining an adjustment to how the network resource is allocated for the first candidate route, wherein the adjustment is based at least in part on a projected utilization value for the network resource to transmit the selected physical item from the first geographic location identified by the source address' to the second geographic location identified by the destination address, as compared to a planned utilization value for the network resource, and where the projected utilization value for the network resource is determined from an estimated resource demand for the network resource; generating a first metric for the first candidate route based at least in part on: (i) network resource information for the network resource, and (ii) the adjustment to how the network resource is allocated for the first candidate route; generating a second metric for the second candidate route based at least in part on alternate network resource information for the alternate network resource; determining that the first metric identifies a utilization level that is less than a utilization level identified by the second metric; and transmitting a routing message including instructions to route the selected physical item according to the first candidate route.

12. The computer-implemented method of claim 11, further comprising:
receiving, from a topology server, resource information identifying the network resource for transmitting a first physical item and a second physical item from the first geographic location identified by the source address to the second geographic location identified by the destination address;
receiving, from a demand forecasting system, the estimated resource demand for the network resource;
generating the projected utilization value for transmitting at least one of the first physical item or the second physical item to the second geographic location using the network resource, said generated based at least in part on the estimated resource demand;
identifying a first potential route for transmitting the first physical item from the first geographic location identified by the source address to the second geographic location identified by the destination address based at least in part on the network resource information for the network resource and at least one constraint on the network resource;
identifying a second potential route for transmitting the second physical item from the first geographic location identified by the source address to the second geographic location identified by the destination address based at least in part on the network resource information for the network resource and at least one constraint on the network resource;
generating a planned utilization level for the network resource based at least in part on utilization of the network resource in the first potential route and utilization of the network resource in the second potential route; and
generating the adjustment to how the resource is allocated based at least in part on a comparison of the planned utilization level for the network resource and the projected utilization value for the network resource.

13. The computer-implemented method of claim 12, further comprising:
storing, in a data store, information indicating that instructions to route the selected physical item according to the first candidate route were transmitted.

14. The computer-implemented method of claim 12, further comprising receiving, from a data store, a planning period identifying a period of time during which physical items will be transmitted, wherein the estimated resource demand includes a demand estimate for a length of time corresponding to the period of time.

15. The computer-implemented method of claim 11, wherein the resource information for the resource includes: (i) a resource cost for handling the selected physical item; (ii) a resource capacity indicating a threshold quantity of physical items that can be handled by the resource for a period of time; and (iii) a transmission path to at least one other resource that can receive the selected physical item from the resource, wherein the computer-implemented method further comprises: determining that a first potential network resource and a second potential network resource can receive the selected physical item from the network resource based at least in part on the resource information for the network resource; receiving, from a data store, a routing policy identifying a criterion for generating routes for a first physical item and a second physical item; identifying a first value for the first potential network resource included in first resource information corresponding to the criterion; identifying a second value for the second potential network resource included in second resource information corresponding to the criterion; and selecting the first potential resource for the first candidate route based at least in part on the routing policy and the first value and the second value.

16. The computer-implemented method of claim 11 further comprising: receiving, from a data store, a costing policy indicating how values included in resource information for a candidate resource are combined to generate the cost, where the costing policy identifies a set of cost values for the candidate resource included in the resource information, wherein the set of cost values include the adjustment.

17. The computer-implemented method of claim 11,
wherein the routing message includes a shipping manifest entry; and
wherein transmitting the routing message comprises:
adding the shipping manifest entry to a shipping manifest for a resource included in the first candidate route.

18. The computer-implemented method of claim 11,
further comprising adjusting an operational state of processing equipment at the first geographic location to direct transmitting of the selected physical item from the first geographical location identified by the source address to the second geographic location identified by the destination address.

\* \* \* \* \*